United States Patent
Anderson et al.

(10) Patent No.: US 8,556,356 B2
(45) Date of Patent: Oct. 15, 2013

(54) COMMUNICATION SHELF HAVING SUPPORTS FOR PIVOTABLE ADAPTER PANELS AND METHOD OF MOUNTING ADAPTER PANELS THEREIN

(75) Inventors: Timothy W. Anderson, Omaha, NE (US); Craig B. Wilson, Allen, TX (US); Andrew Foreman, Carrollton, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 373 days.

(21) Appl. No.: 13/031,269

(22) Filed: Feb. 21, 2011

(65) Prior Publication Data

US 2012/0211447 A1 Aug. 23, 2012

(51) Int. Cl.
*A47G 29/22* (2006.01)

(52) U.S. Cl.
USPC .......................................... 312/265.1; 211/26

(58) Field of Classification Search
USPC .......... 312/265.1, 265.2, 265.3, 265.4, 223.1, 312/223.2, 319.1, 334.46, 334.4, 334.5; 108/180, 192, 193, 153.1, 157.13; 211/261, 26; 385/135, 136; 248/220.21, 222.11, 241

See application file for complete search history.

(56) References Cited

U.S. PATENT DOCUMENTS

| | | | |
|---|---|---|---|
| 6,070,957 A * | 6/2000 | Zachrai | 312/334.4 |
| 6,263,141 B1 | 7/2001 | Smith | |
| 6,422,399 B1 * | 7/2002 | Castillo et al. | 211/26 |
| 6,438,310 B1 | 8/2002 | Lance | |
| 6,504,988 B1 | 1/2003 | Trebesch | |
| 6,591,051 B2 | 7/2003 | Solheid | |
| 6,748,155 B2 | 6/2004 | Kim | |
| 6,773,080 B2 * | 8/2004 | Chen et al. | 312/265.1 |
| 6,929,339 B1 * | 8/2005 | Greenwald et al. | 312/334.4 |
| 6,937,807 B2 | 8/2005 | Franklin | |
| 6,944,389 B2 | 9/2005 | Giraud | |
| 6,968,111 B2 | 11/2005 | Trebesch | |
| 7,068,907 B2 | 6/2006 | Schray | |
| 7,079,744 B2 | 7/2006 | Douglas | |
| 7,120,348 B2 | 10/2006 | Trebesch | |
| 7,494,101 B2 * | 2/2009 | Chen | 248/298.1 |
| 7,798,581 B2 * | 9/2010 | Chen et al. | 312/265.1 |
| 8,292,382 B2 * | 10/2012 | Cheng | 312/334.4 |
| 8,408,506 B2 * | 4/2013 | Yu et al. | 248/219.1 |
| 2004/0159618 A1 * | 8/2004 | Nguyen et al. | 211/26 |
| 2004/0189161 A1 * | 9/2004 | Davis et al. | 312/265.3 |
| 2006/0000961 A1 * | 1/2006 | Wei-Chieh et al. | 248/223.41 |
| 2010/0054685 A1 | 3/2010 | Cooke | |
| 2010/0310225 A1 | 12/2010 | Anderson | |
| 2010/0322581 A1 | 12/2010 | Cooke | |

* cited by examiner

*Primary Examiner* — Jose V Chen
(74) *Attorney, Agent, or Firm* — Muncy, Geissler, Olds & Lowe PLLC (57) ABSTRACT

A communications shelf configured to support at least one communications adapter panel includes first and second spaced sidewalls and a first bracket mounted at the first sidewall, the first bracket including a mounting portion fixed relative to the first sidewall and a cantilevered portion projecting away from the first bracket mounting portion and having an end, the first bracket cantilevered portion being configured to shift from a first position wherein the first bracket cantilevered portion end is spaced a first distance from the first sidewall to a second position wherein the first bracket cantilevered end is spaced a second, smaller distance, from the first sidewall under application of a force and to return to the first position when the force is discontinued, the first bracket cantilevered portion including at least one pivot pin or at least one opening forming a bearing for a pivot shaft.

19 Claims, 5 Drawing Sheets

COMMUNICATION SHELF HAVING SUPPORTS FOR PIVOTABLE ADAPTER PANELS AND METHOD OF MOUNTING ADAPTER PANELS THEREIN

BACKGROUND OF THE INVENTION

1. Field of the Invention

The present invention relates to storage/organizing devices used in networking environments. More particularly, the present invention relates to a communications patching system that includes a support for communications lines and one or more panels pivotably mounted to the support, the panels including holders for communications adapters.

2. Description of the Related Art

In communication cabinets and racks, a multitude of cables are interconnected to one another via splices and connectors, such as adapters in the case of fiber optic cables and jacks in the case of copper conductor cables. A cable organization unit having a tray or shelf or similar platform is a convenient way to mount cabling devices, such as splice holders, adapters and slack storage devices (e.g., clips, guides, spools). The cabling devices may be mounted to the shelf in a highly organized fashion. Optionally, the cabling devices may be withdrawn from a housing mounted to the rack or cabinet via a sliding action of the shelf to provide for easy access and manipulation of the cabling devices on a rear portion of the shelf by a technician. The front portion of the shelf typically presents a bulkhead populated with adapters (in the case of fiber optic connections) or jacks (in the case of copper cables, such as twisted pair cables or coaxial cables).

Such cable organization units are generally known in the background art and more details of such devices may be seen in U.S. Pat. Nos. 7,120,348; 7,079,744; 7,068,907; 6,968,111; 6,944,389; 6,937,807; 6,748,155; 6,591,051; 6,504,988; 6,438,310; and 6,263,141, each of which is herein incorporated by reference.

It is desirable to provide fiber optic distribution equipment/copper cable distribution equipment, like patch panels, with increased connector port density. "Density" refers to the number of locations, or ports, per unit volume or unit area for providing connections. Many shelves are configured to a standard size. A standard height of 1.75 inches is known in the art as a "rack unit" or "U". For example, a 2 U shelf would have a height of 3.5 inches. If a 2 U shelf had 96 connections, the shelf would have a 48 connections/U density.

On a standard shelf in accordance with the background art, the higher the connection/U density, the more difficult it is to make connections and disconnections, and labeling of ports is more closely spaced and difficult to understand and view. However, in some network environments (such as storage area network (SAN) environments), there is a need for a higher density adapter/jack arrangement on the bulkhead of the shelf. The higher density adapter/jack arrangement also needs to be sized to be installed on a standard sized shelf of a traditional rack and/or cabinet. One such application is in cabinet patching support of high density SAN switching hardware that typically takes up most of the available rack space. A patch panel with higher density than traditional patch panels would have value and use in this application.

Fiber optic patch panel shelves typically include metal drawer type shelves in a 1 U or greater size (e.g., 1 U, 2 U, 3 U and 4 U are typical sizes of design configurations). The shelves are populated with fiber optic adapters in panels, have space for behind-the-bulkhead-wall cable management, options for splicing, support for pre-terminated hardware, and a trough in the front for fiber optic patch cord management. There are available fixed and sliding versions of these shelves. The sliding versions typically use drawer type slides to allow the shelf to slide out of the front plane of the equipment rack. These shelves may include modular cable organizing products pre-installed at the factory or connection features to accommodate modular cable organizing products installed in the field.

The traditional fiber shelves have typically been configured with a single patch panel or multiple modular patch panels on the front patching side of a bulkhead of the shelf in either a single continuous plane or two angled planes to ease patching. With this configuration, total density of connectors/adapters has been limited to the available space in the rack unit that the shelf resides in, and by the ergonomics associated with installing and removing connectors from the fiber adapters/cable jacks on the patch panel. Specifically, if the adapters are placed too closely together it becomes difficult to grasp a connector to insert it into or remove it from the adapter.

The foregoing issues are addressed by an invention described in co-pending U.S. patent application Ser. No. 12/793,728, filed Jun. 4, 2010, assigned to the present assignee, and the entire contents of that application are hereby incorporated by reference. In the '728 application, one or more patch panels or adapter panels are pivotably mounted in a frame or shelf so that each can be pivoted to a position that provides increased space for attaching connectors to or removing connectors from the panel. The panels can also be pivoted to a position in which the panels are closely spaced for storage in a manner that may not leave sufficient room to easily attach or detach connectors. In the '728 application, tools are generally required to mount and remove the panels. It would be desirable to be able to mount and remove patch panels and adapter panels in various environments, including the one disclosed in the '728 application, without the use of tools.

SUMMARY OF THE INVENTION

This problem and others are addressed by embodiments of the present invention, a first aspect of which comprises a communications shelf configured to support at least one communications adapter panel. The shelf includes first and second spaced sidewalls and a first bracket mounted at the first sidewall, and the first bracket includes a mounting portion fixed relative to the first sidewall and a cantilevered portion projecting away from the first bracket mounting portion and an end. The first bracket cantilevered portion is configured to shift from a first position, wherein its end is spaced a first distance from the first sidewall to a second position wherein its end is spaced a second, smaller, distance, from the first sidewall under application of a force and to return to the first position when the force is discontinued. The first bracket cantilevered portion includes at least one pivot pin or at least one opening forming a bearing for a pivot shaft.

Another aspect of the invention comprises a method of mounting a communications adapter panel between first and second spaced supports that includes providing a first pivot pin or a first opening for receiving a pivot shaft at the first support, providing a bracket on the second support, the bracket including a mounting opening or a pivot pin and providing a communications adapter panel having first and second pivot shafts or first and second holes for receiving pivot pins. The method also includes placing the adapter panel first pivot shaft in the first support first opening or placing the first support first pivot pin in the adapter panel first hole, applying a force against the cantilevered portion of the bracket to flex the cantilevered portion toward the second support, aligning the adapter panel second pivot shaft with the bracket second opening or aligning the adapter panel second hole with the bracket second pivot pin, and removing the force from the cantilevered portion so that the cantilevered portion moves toward the adapter panel and the adapter panel second pivot pin is received in the bracket second opening or so that the bracket second pivot shaft is received in the adapter panel second hole.

A further aspect of the invention comprises a rack comprising first and second supports, an interior and a plurality of communications shelves slidably mounted in the rack for movement into and out of the rack interior. Each of the plurality of communications shelves has a first sidewall including a first flange connected to the first support and a second sidewall spaced from the first sidewall with a second flange connected to the second support. First and second spaced brackets are mounted along the first and second sidewalls, and each of the first and second brackets includes at least one pivot pin or at least one opening forming a bearing for a pivot shaft. The first bracket includes a mounting portion fixed relative to the first sidewall and a cantilevered portion projecting away from the mounting portion toward the rack interior and having an end, and the cantilevered portion is configured to flex away from a starting position under application of a force and to spring back to the starting position when the force is removed. The cantilevered portion includes the at least one pivot pin or at least one opening of the first bracket.

BRIEF DESCRIPTION OF THE DRAWINGS

These aspects of the invention and others will be better understood after a reading of the following detailed description together with the attached drawings, wherein.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
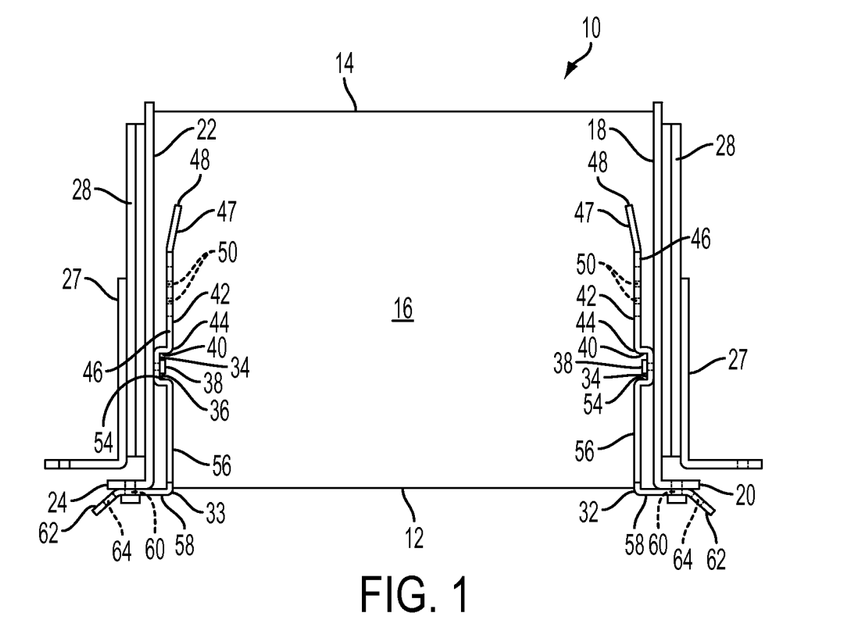
FIG. 1 is a top plan view of a communication shelf, including first and second brackets, according to a first embodiment of the present invention.
Figure 9:
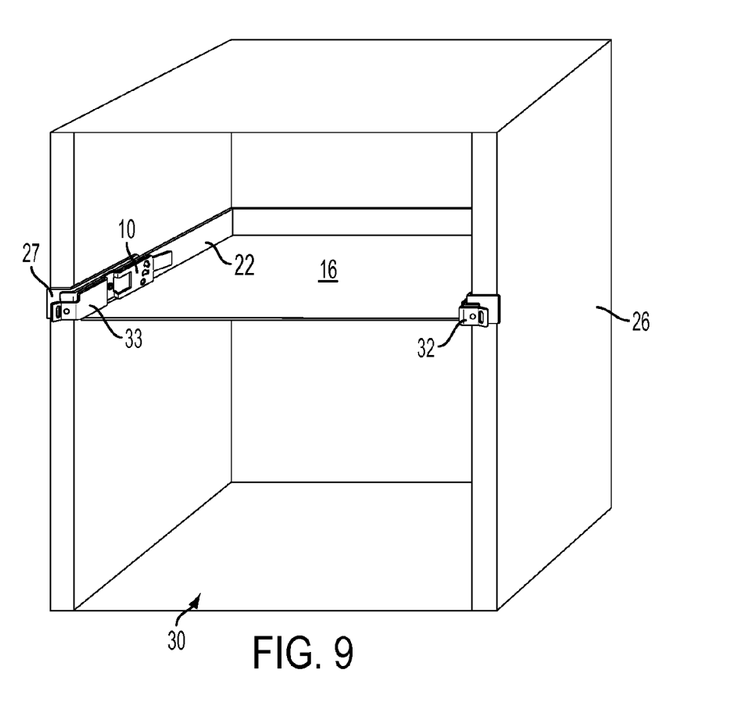
FIG. 9 is a perspective view of a rack containing the communications shelf of FIG. 1.

FIG. 1 illustrates a shelf 10 having a front 12, a rear 14, a floor 16, a first side 18 having a first flange 20 at the front of the shelf and a second side 22 having a second flange 24 at the front of the shelf. Drawer slides 28 are mounted to first and second sides 18, 22 of shelf 10, and brackets 27 on the drawer slides 28 may be used to mount shelf 10 in a rack 26, illustrated in FIG. 9. The drawer slides 28 allow the shelf 10 to slide into and out of the rack interior 30.

Figure 4:
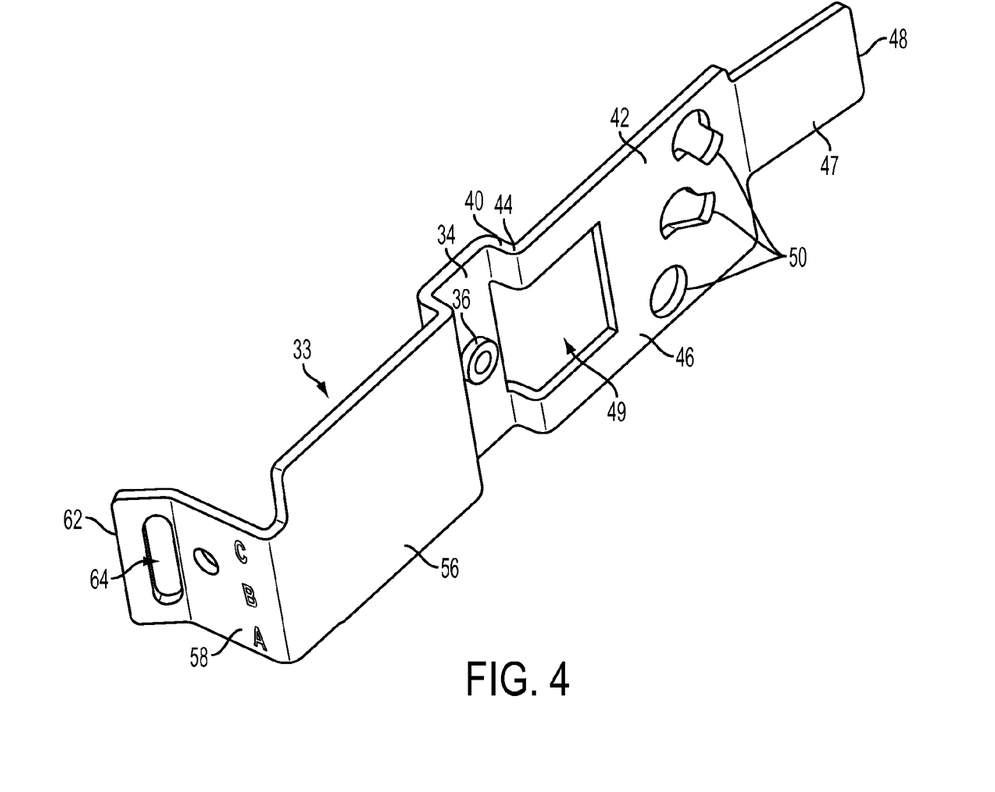
FIG. 4 is a perspective view of one of the brackets illustrated in FIG. 1.

A first bracket 32 is mounted at first side 18 of the shelf 10, and a second bracket 33, illustrated by itself in FIG. 4, is mounted at the second side 22 of the shelf 10. First bracket 32 is a mirror image of second bracket 33, and the following description is directed primarily to second bracket 33. Second bracket 33 includes a mounting portion 34 in a central portion thereof which mounting portion 34 comprises a planar wall portion that overlies second side 22 of shelf 10 and includes a mounting opening 36 through which a fastener such as bolt 38 extends to secure the mounting portion 34 to the second side 22 of the shelf 10. A first spacer wall 40 extends in a first direction from mounting portion 34 at approximately 90 degrees to the mounting portion 34, and a cantilevered portion 42 forms a corner 44 with first spacer wall 40 and projects away from first spacer wall 40 and mounting portion 34, toward the rear 14 of shelf 10 when second bracket 33 is mounted on the shelf 10. Cantilevered portion 42 has a relatively wide portion 46, illustrated in FIG. 4, that is approximately the same width as the mounting portion 34 and a narrower portion 47 that extends from the relatively wide portion 46 at an angle to the end 48 of the second bracket 33. Wide portion 46 includes a cutout 49 which increases the flexibility of corner 44 and openings 50 which form bearings for pivot shafts described hereinafter.

A second spacer wall 54 extends from mounting portion 34 on the side of mounting portion 34 opposite first spacer wall 40 in the first direction at approximately 90 degrees, and a projecting member 56 extends from second spacer wall 54 away from cantilevered portion 42 in the direction of front 12 of shelf 10. An end portion 58 of the second bracket 33 extends from projecting member 56 in a second direction opposite the first direction. End portion 58 is longer than second spacer wall 54 and thus projects through and past the plane of mounting portion 34 and overlies a front portion of second flange 24. End portion 58 includes a mounting opening 60 for securing end portion 58 to second side 22 of shelf 10. Flared member 62 extends at approximately a 45 degree angle away from end portion 58 and includes a slot 64.

Figure 2:
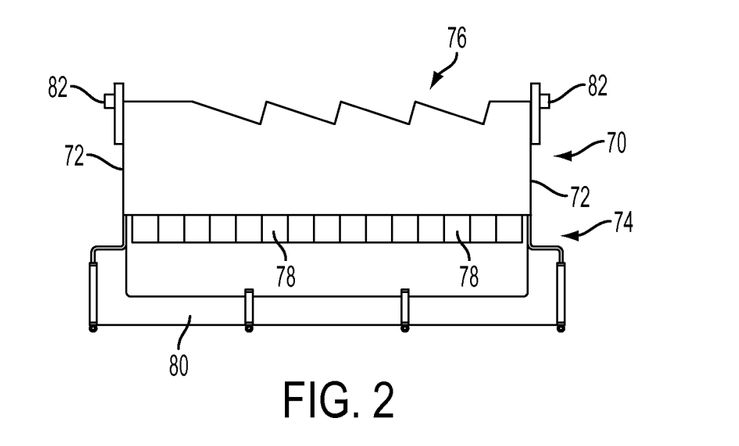
FIG. 2 is a top plan view of an adapter panel mountable in the communications shelf of FIG. 1.

Communications shelf 10 further includes an adapter panel 70, illustrated apart from shelf 10 in FIG. 2, having first and second sides 72, a front 74, a rear 76, a plurality of adapters 78 and a trough 80 for guiding cables (not illustrated) connected to the adapters 78. Pivot shafts 82 extend in opposite directions from first and second sides 72 near rear 76 of adapter panel 70.

With second bracket mounting portion 34 secured to second side 22 of shelf 10 and end portion 58 of second bracket 33 secured to second flange 24, cantilevered portion 42 can be flexed toward second side 22 of shelf 10 by applying a force against end 48 to press end 48 toward the second side 22. Second bracket 33 is preferably formed from sheet metal which has sufficient flexibility, along its length and at corner 44, to allow end 48 of second bracket 33 to move one quarter to one-half inch toward second side 22 of shelf 10 and to spring back to its original position, generally parallel to second side 22, when the force pressing it toward the second side 22 is released. Cutout 49 increases this flexibility, and the angle made by narrow portion 47 of the second bracket 33 relative to the wide portion 46 increases the degree to which the cantilevered portion 42 can be flexed. The distance separating the ends of pivot shafts 82 on adapter panel 70 is greater than the distance between the wide portion 46 of first mounting bracket 32 and the wide portion 46 of second mounting bracket 33. In order to mount the adapter panel 70 in shelf 10, therefore, the distance between the first and second mounting brackets 32, 33 must be increased. Three ways of mounting the adapter panel 70 in shelf 10 are described below.

If relatively stiff sheet metal is used, it may be necessary to flex the cantilevered portions 42 of both first and second brackets 32, 33 toward the first and second sides 18, 20 of the shelf 10. One way of doing this is to have a first person press each of the first and second mounting brackets 32, 33 toward its respective side of the shelf 10 while a second person positions the adapter panel 70 between the openings 50 on the respective first and second brackets 32, 33. The first person would then release the pressure on the first and second mounting brackets 32, 33 to allow the pivot shafts 82 on the adapter panels 70 to enter the holes 50 on the first and second brackets 32, 33, leaving adapter panel 70 pivotably supported on pivot shafts 82 in openings 50. Adapter panel 70 may be removed from between the first and second brackets 32, 33 by reversing this process.

Figure 3:
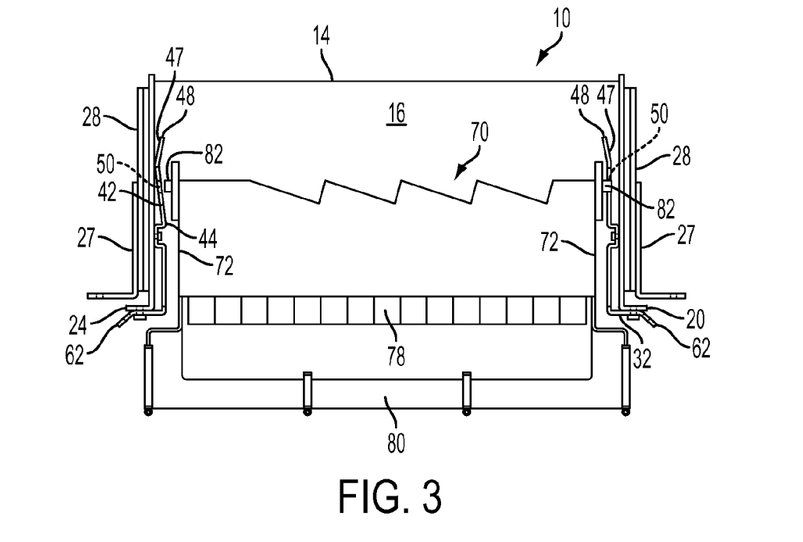
FIG. 3 is a top plan view of the adapter panel of FIG. 2 being mounted in the communications shelf of FIG. 1.

Alternately, one person could mount adapter panel 70 in shelf 10 by placing the first pivot shaft 82 of the adapter panel 70 in one of the openings 50 of the first mounting bracket 32 and then pressing the narrow portion 47 of the second mounting bracket 33 toward second side 22 of shelf 10 as illustrated in FIG. 3 (with or without pressing the second side 72 of the adapter panel 70 toward first side 18 of the shelf 10 to flex the first bracket 32 toward the first side 18), until the distance between the first and second mounting brackets 32, 33 is sufficient to allow the second pivot shaft 82 of the adapter panel 70 to enter the corresponding mounting opening 50 in the second mounting bracket 33. Pressure is then removed from the narrow portion 47 of the second mounting bracket 33 to allow the second mounting bracket 33 to return to its unflexed position. In this position, the first and second pivot shafts 82 of adapter panel 70 are pivotably supported in the bearings formed by mounting openings 50 in the first and second mounting brackets 32, 33. The adapter panels 70 may be removed from between the first and second mounting brackets 32, 33 by reversing the foregoing steps.

Alternately, if the second bracket 33 has sufficient flexibility, and if sufficient clearance is available between the second bracket 33 and the second side 22 of the shelf 10, it may be possible to install adapter panel 70 by flexing the cantilevered portion 42 of second bracket 33 without moving first bracket 32. In such case, it would be possible to replace first bracket 32 with a different bracket (not illustrated) that does not have a cantilevered portion. Alternately, a mounting opening or pivot pin could be formed directly on a portion of shelf 10 to support one side of adapter panel 70 while the cantilevered portion 42 of the second bracket 33 is flexed to accommodate a pivot shaft of adapter panel 70.

Which arrangement is used will depend in part on the width of the shelf and the clearances available between the brackets and the sides of the shelf. Beneficially, the use of a pair of flexible brackets such as first and second brackets 32, 33 allows the adapter panel 70 to be installed by inserting either the left side of the adapter panel in the second bracket 33 and flexing primarily the first bracket 32 or by inserting the right side of adapter panel 70 in the first bracket 32 and flexing primarily the second bracket 33, depending on the preference of the installer and the location of the shelf 10.

Figure 5:
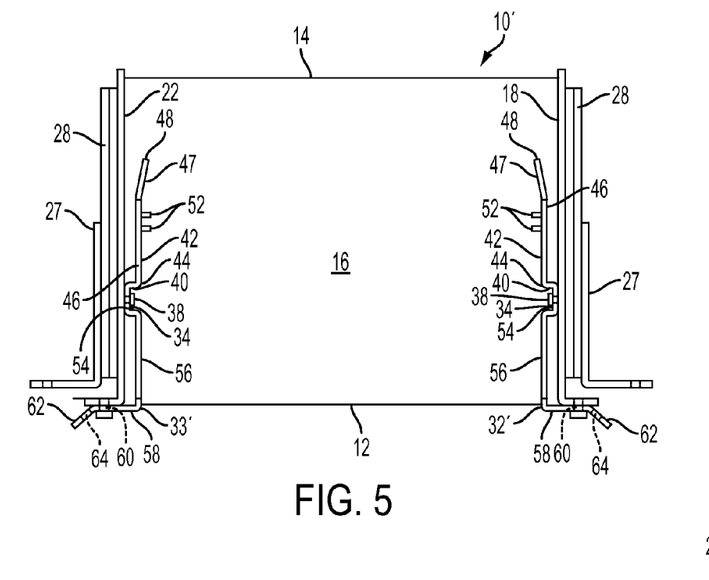
FIG. 5 is a top plan view of a communication shelf, including first and second brackets, according to a second embodiment of the present invention.
Figure 6:
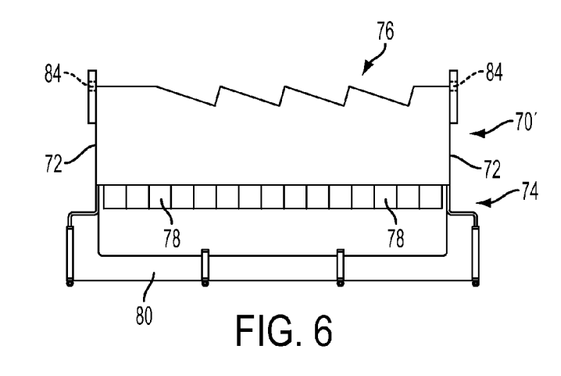
FIG. 6 is a top plan view of an adapter panel mountable in the communications shelf of FIG. 5.
Figure 7:
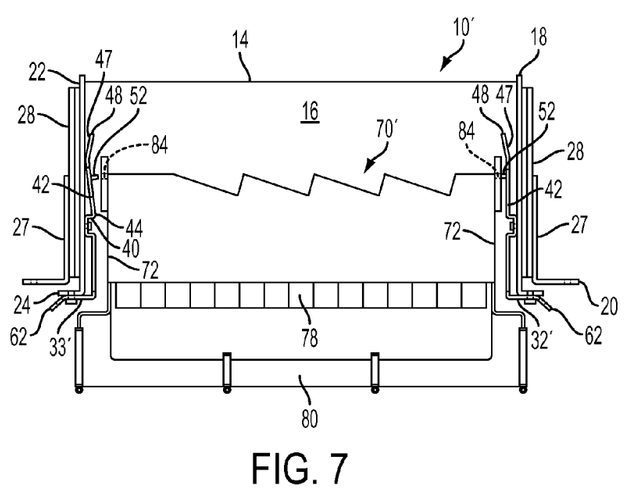
FIG. 7 is a top plan view of the adapter panel of FIG. 6 being mounted in the communications shelf of FIG. 5.
Figure 8:
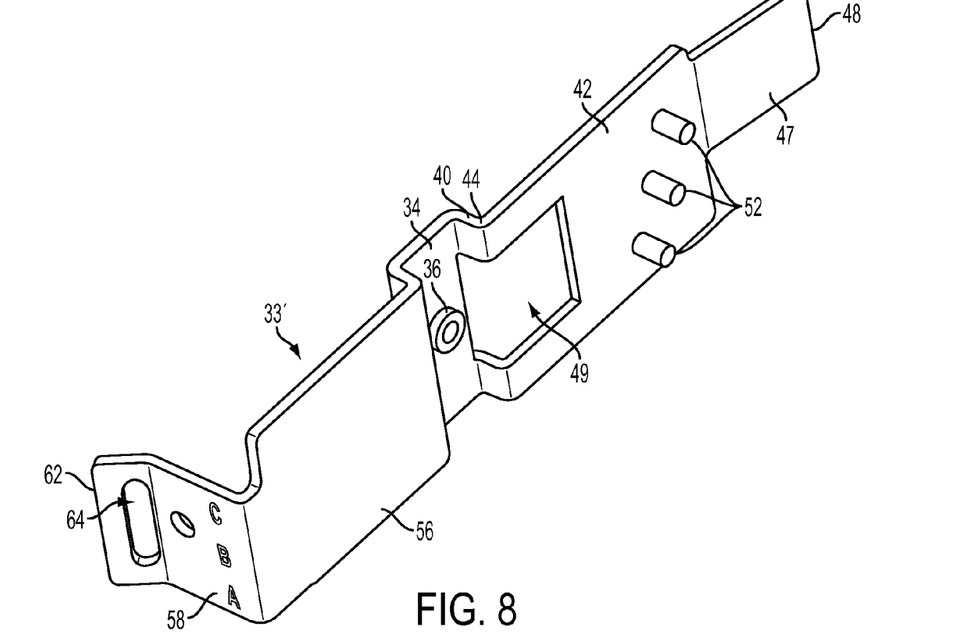
FIG. 8 is a perspective view of one of the brackets illustrated in FIG. 5.

A second embodiment of the present invention will now be described in connection with the mounting of an adapter panel 70' illustrated in FIG. 6 in a shelf 10' of FIG. 5 using a second bracket 33' illustrated by itself in FIG. 8 and a first bracket 32' that is a mirror image of second bracket 33'. Most elements of this second embodiment are identical to those of the first embodiment and will not be described again. Elements that are similar but not identical to those of the first embodiment are identified with the reference numeral of the similar element and a prime ('). First and second brackets 32' and 33' each include pivot pins 52 in place of openings 50 of the first embodiment, and adapter panel 70' of FIG. 6 includes a hole 84 instead of the pivot shaft 82 of the first embodiment. Adapter panel 70' is mounted between first and second mounting brackets 32', 33' in the substantially the same manner as described above in connection with the first embodiment. FIG. 7 illustrates second mounting bracket 33' being flexed toward second side 22 of shelf 10' so that side 72 of adapter panel 70' can fit between the first and second pivot pins 52 of mounting brackets 32', 33' after which second bracket 33' is allowed to return to its unflexed position so that pivot pin 52 on the second mounting bracket 33' can enter hole 84 of adapter panel 70'. With holes 84 on sides 72 of the adapter panel 70', it may be possible to remove the adapter panel 70 in the direction of the front 12 of shelf 10 if the pivot pins 52 are removed from the holes 84. The pivot shafts 82 of the adapter panel 70 of the first embodiment may make it more difficult for the adapter panel 70 to move toward the front of the shelf 10. Whether or not it is desirable to allow an adapter panel to move toward the front of shelf 10 when released from its pivot supports may recommend one of the embodiments over the other.

Figure 10:
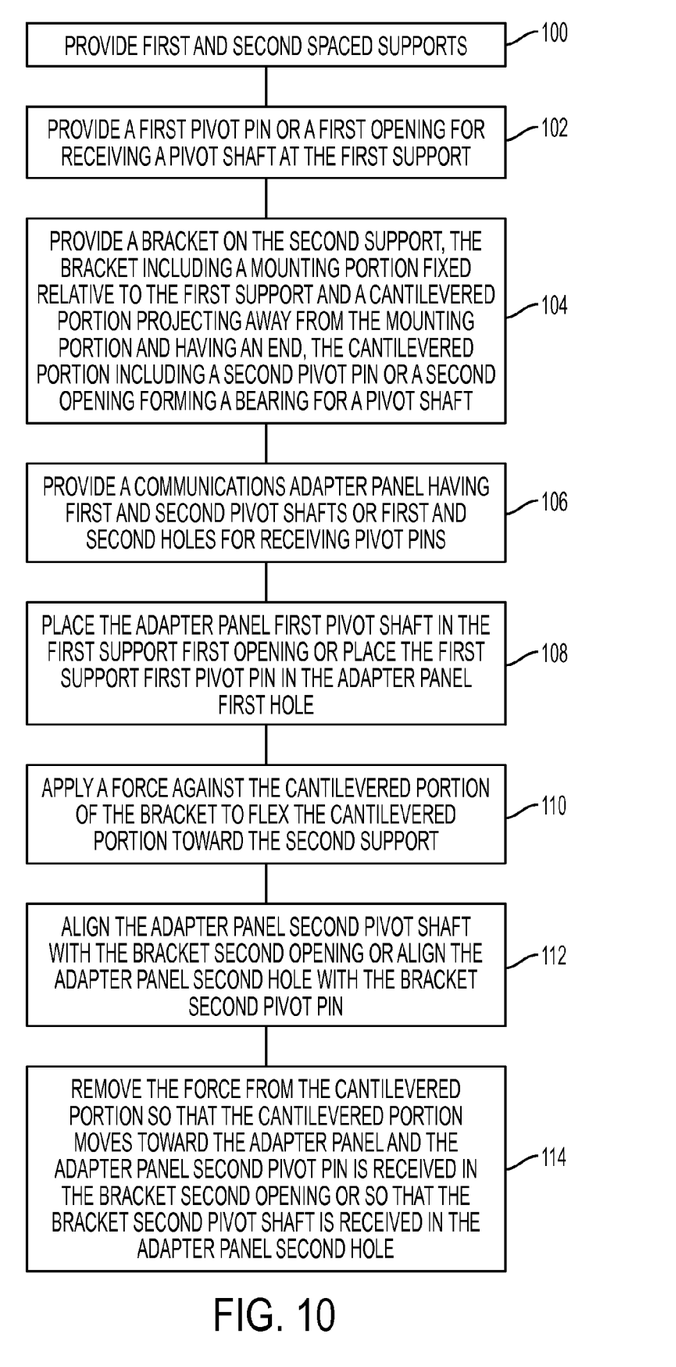
FIG. 10 is a flow chart illustrating a method according to an embodiment of the invention.

A method according to an embodiment of the present invention is illustrated in FIG. 10 and includes a step 100 of providing first and second spaced supports, a step 102 of providing a first pivot pin or a first opening for receiving a pivot shaft at the first support and a step 104 of providing a bracket on the second support, the bracket including a mounting portion fixed relative to the first support and a cantilevered portion projecting away from the mounting portion and having an end, the cantilevered portion including a second pivot pin or a second opening forming a bearing for a pivot shaft. The method also includes a step 106 of providing a communications adapter panel having first and second pivot shafts or first and second holes for receiving pivot pins, a step 108 of placing the adapter panel first pivot shaft in the first support first opening or placing the first support first pivot pin in the adapter panel first hole and a step 110 of applying a force against the cantilevered portion of the bracket to flex the cantilevered portion toward the second support. The method further includes a step 112 of aligning the adapter panel second pivot shaft with the bracket second opening or aligning the adapter panel second hole with the bracket second pivot pin and a step 114 of removing the force from the cantilevered portion so that the cantilevered portion moves toward the adapter panel and the adapter panel second pivot pin is received in the bracket second opening or so that the bracket second pivot shaft is received in the adapter panel second hole.

The present invention has been described herein in terms of several presently preferred embodiments. Modifications and additions to these embodiments will become apparent to persons of ordinary skill in the relevant art upon a reading of the foregoing description. It is intended that all modifications and additions to these embodiments comprise a part of the present invention to the extent they fall within the scope of the several claims appended hereto.

We claim:

1. A communications shelf configured to support at least one communications adapter panel comprising:
   first and second spaced sidewalls; and
   a first bracket mounted at said first sidewall, said first bracket including a mounting portion fixed relative to said first sidewall and a cantilevered portion projecting away from said first bracket mounting portion and having an end, said first bracket cantilevered portion being configured to shift from a first position wherein said first bracket cantilevered portion end is spaced a first distance from said first sidewall to a second position wherein said first bracket cantilevered portion end is spaced a second distance, smaller than said first distance, from said first sidewall under application of a force applied to said first bracket cantilevered portion and to return to said first position when said force applied to said first bracket cantilevered portion is discontinued, said first bracket cantilevered portion including at least one pivot pin or at least one opening forming a bearing for a pivot shaft.

2. The communications shelf of claim 1, including a second bracket mounted at said second sidewall, said second bracket including a mounting portion fixed relative to said second sidewall and a cantilevered portion projecting away from said second bracket mounting portion and having an end, said second bracket cantilevered portion being configured to shift from a third position wherein said second bracket cantilevered portion end is spaced a third distance from said second sidewall to a fourth position wherein said second bracket cantilevered portion end is spaced a fourth distance, smaller than said third distance, from said second sidewall under application of a force applied to said second bracket cantilevered portion and to return to said first position when said force applied to said second bracket cantilevered portion is discontinued, said second bracket cantilevered portion including at least one pivot pin or at least one opening forming a bearing for a pivot shaft.

3. The communications shelf of claim 2, including at least one adapter panel having first and second spaced pivot shafts, the first pivot shaft being mounted in the at least one opening of the first bracket cantilevered portion and the second pivot shaft being mounted in the at least one opening of the second bracket cantilevered portion.

4. The communications shelf of claim 2, including at least one adapter panel having holes for pivotably supporting the adapter panel on spaced pivot pins, the first hole receiving the at least one pivot pin of the first bracket and the second hole receiving the at least one pivot pin of the second bracket.

5. The communications shelf of claim 2 wherein,
   said first bracket includes a projecting portion projecting from said first bracket mounting portion, said first bracket projecting portion including an end portion angled relative to said first bracket projecting portion and connected to said first sidewall at a location spaced from said first bracket mounting portion,
   said second bracket includes a projecting portion projecting from said second bracket mounting portion, said second bracket projecting portion including an end portion angled relative to said second bracket projecting portion and connected to said second sidewall at a location spaced from said second bracket mounting portion,
   said cantilevered portions of said first and second brackets each have a first region having a first width and a cutout and a second region having a second width less than said first width, said at least one pivot pin or at least one opening being located in said first region and said second region being located between said first region and said cantilevered portion end,
   said mounting portion of said first bracket includes a first wall overlying said first sidewall and a second wall projecting from said first wall, said cantilevered portion of said first bracket projecting from said second wall; and
   said mounting portion of said second bracket includes a third wall overlying said second sidewall and a fourth wall projecting from said third wall, said cantilevered portion of said second bracket projecting from said fourth wall.

6. The communications shelf of claim 1 including at least one adapter panel having a pivot shaft mounted in the at least one opening in the cantilevered portion of the first bracket or a hole receiving the at least one pivot pin of the first bracket cantilevered portion.

7. The communications shelf of claim 1, wherein said cantilevered portion of said first bracket projects from a first side of said first bracket mounting portion and wherein said first bracket includes a projecting portion projecting from a second side of said first bracket mounting portion said projecting portion having an end portion angled relative to said first bracket projecting portion, said first bracket end portion being connected to said first sidewall at a location spaced from said first bracket mounting portion.

8. The communications shelf of claim 7, wherein said first bracket projecting portion and said first bracket cantilevered portion lie substantially in a first plane and wherein said first bracket mounting portion lies in a second plane substantially parallel to said first plane.

9. The communications shelf of claim 8, wherein said first bracket end portion extends from said first bracket projecting portion through and beyond said second plane.

10. The communications shelf of claim 1, wherein said first bracket cantilevered portion has a first region having a first width and a cutout in said first region, and a second region having a second width less than said first width, said at least one pivot pin or at least one opening of the first bracket being located in said first region and said second region being located between said first region and said first bracket cantilevered portion end.

11. The communications shelf of claim 1 wherein said first bracket mounting portion includes a first wall overlying said first sidewall and a second wall projecting from said first wall and wherein said first bracket cantilevered portion projects from said second wall.

12. A rack including the communications shelf of claim 1.

13. A method of mounting a communications adapter panel between first and second spaced supports comprising:
providing a first pivot pin or a first opening for receiving a pivot shaft at the first support;
providing a bracket on the second support, the bracket including a second opening or a second pivot pin in a cantilevered portion projecting from a mounting portion;
providing a communications adapter panel having first and second pivot shafts or first and second holes for receiving pivot pins;
placing the adapter panel first pivot shaft in the first support first opening or placing the first support first pivot pin in the adapter panel first hole;
applying a force against the cantilevered portion of the bracket to flex the cantilevered portion toward the second support;
aligning the adapter panel second pivot shaft with the bracket second opening or aligning the adapter panel second hole with the bracket second pivot pin; and
removing the force from the cantilevered portion so that the cantilevered portion moves toward the adapter panel and the adapter panel second pivot shaft is received in the bracket second opening or so that the bracket second pivot pin is received in the adapter panel second hole.

14. The method of claim 13 including providing an additional bracket on the first support, the additional bracket including the first pivot pin or the first opening for receiving a pivot shaft.

15. A rack comprising first and second supports, an interior and a plurality of communications shelves slidably mounted in the rack for movement into and out of the rack interior, each of said plurality of communications shelves comprising:
a first sidewall including a first flange connected to the first support and a second sidewall spaced from the first sidewall and including a second flange connected to said second support;
first and second spaced brackets mounted along said first and second sidewalls, each of said first and second brackets including at least one pivot pin or at least one opening forming a bearing for a pivot shaft, said first bracket including a mounting portion fixed relative to said first sidewall and a cantilevered portion projecting away from said mounting portion toward said rack interior and having an end, said cantilevered portion being configured to flex away from a starting position under application of a force applied to said cantilevered portion and to spring back to the starting position when the force applied to said cantilevered portion is removed, said cantilevered portion including the at least one pivot pin or at least one opening of said first bracket.

16. The rack of claim 15, including at least one adapter panel having first and second spaced pivot shafts, the first pivot shaft being mounted in the at least one opening of the first bracket cantilevered portion and the second pivot shaft being mounted in the at least one opening of the second bracket.

17. The rack of claim 15, wherein, said first bracket includes a projecting portion projecting from a side of said mounting portion opposite from said cantilevered portion, said projecting portion including an end portion angled relative to said projecting portion and overlying said first flange.

18. The rack of claim 17, wherein said cantilevered portion has a first region having a first width and a cutout and a second region having a second width less than said first width, said at least one pivot pin or at least one opening forming a bearing for a pivot shaft being located in said first region and said second region being located between said first region and an end of said cantilevered portion.

19. The rack of claim 15, including at least one adapter panel having first and second holes for pivotably supporting the adapter panel on spaced pivot pins, the first hole receiving the at least one pivot pin of the first bracket and the second hole receiving the at least one pivot pin of the second bracket.

* * * * *